US 7,236,852 B2

(12) United States Patent
Moridaira et al.

(10) Patent No.: US 7,236,852 B2
(45) Date of Patent: Jun. 26, 2007

(54) MOTION CONTROLLING APPARATUS AND METHOD AND REMOTE CONTROLLING APPARATUS AND METHOD FOR LEGGED MOBILE ROBOT

(75) Inventors: Tomohisa Moridaira, Tokyo (JP); Jinichi Yamaguchi, 5-14-38, Tamadaira, Hino-shi, Tokyo (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 647 days.

(21) Appl. No.: 10/683,496

(22) Filed: Oct. 10, 2003

(65) Prior Publication Data

US 2004/0205417 A1 Oct. 14, 2004

(30) Foreign Application Priority Data

Oct. 11, 2002 (JP) ............................. 2002-298355

(51) Int. Cl.
*G06F 19/00* (2006.01)
(52) U.S. Cl. ...................... 700/245; 700/246; 700/251; 700/253; 700/260; 700/261; 318/568.1; 318/568.12; 318/568.16; 318/568.17; 318/568.2; 901/1; 901/9; 901/46
(58) Field of Classification Search ................ 700/245, 700/246, 251, 253, 260, 261; 901/1, 9, 46; 180/8.1, 8.6; 318/568.1, 568.12, 568.16, 318/568.17, 568.2
See application file for complete search history.

(56) References Cited

U.S. PATENT DOCUMENTS

| 6,580,969 | B1* | 6/2003 | Ishida et al. ................. 700/245 |
| 6,802,382 | B2* | 10/2004 | Hattori et al. ............... 180/8.6 |
| 6,832,132 | B2* | 12/2004 | Ishida et al. ................. 700/245 |
| 6,961,640 | B2* | 11/2005 | Kuroki et al. .............. 700/245 |
| 7,053,579 | B2* | 5/2006 | Moridaira .............. 318/568.12 |
| 2002/0010026 | A1* | 1/2002 | York ........................... 463/47 |

* cited by examiner

*Primary Examiner*—Thomas Black
*Assistant Examiner*—McDieunel Marc
(74) *Attorney, Agent, or Firm*—Frommer Lawrence & Haug LLP; William S. Frommer; Paul A. Levy

(57) ABSTRACT

A legged mobile robot itself is responsive to the result of error detection during robot operations to perform error avoiding processing autonomously. In detecting an error, requested commands are all blocked by the internal processing within the robot so that an input to an actuating system does not affect the robot. The type of the error that has occurred is also notified to the actuating system so that feedback to an inputting system 32 may be applied in a manner specific to the error type. When the error is eliminated, that effect is notified to the actuating system to enable re-initiation of the usual command input from the remote operating system.

30 Claims, 5 Drawing Sheets

MOTION CONTROLLING APPARATUS AND METHOD AND REMOTE CONTROLLING APPARATUS AND METHOD FOR LEGGED MOBILE ROBOT

BACKGROUND OF THE INVENTION

1. Field of the Invention

This invention relates to a motion controlling apparatus and a motion controlling method for a legged mobile robot having at least a plural number of mobile legs. This invention especially relates to a motion controlling apparatus and a motion controlling method for a legged mobile robot which may be presupposed to be used in a large variety of different environments.

More particularly, the present invention relates to a motion controlling apparatus and a motion controlling method in which the robot motion on the occasion of occurrence of a reflection type error is guaranteed. More specifically, the invention relates to a motion controlling apparatus and a motion controlling method in which the processing for avoiding the occurrence of the reflective error may be carried out autonomously.

This application claims the priority of the Japanese Patent Application No. 2002-298355 filed on Oct. 11, 2002, the entirety of which is incorporated by reference herein.

2. Description of Related Art

A mechanical apparatus for performing motions simulating the motions of the human being, with the use of electrical or magnetic operations, is termed a "robot". The etymology of the term robot is said to be "ROBOTA" (slave machine) of the Slavic language. In Japan, the robots started to be used towards the end of the 1960s. Most of these robots used were industrial robots, such as manipulators or transporting robots, aimed to automate or perform unmanned tasks in plant operations.

In recent years, researches and developments in legged mobile robots, simulating the bodily mechanism and motions of an animal which is erected and walks on two feet, such as human beings or monkeys, are progressing, such that there are good prospects for practical utilization of these robot types. The motion system by legs, erected and walking on two legs, is unstable as compared to the crawler type system or the system walking on four or six legs, and hence is difficult to control as to posture or walking. However, the motion system by legs, erected and walking on two legs, is favorable in such respects that it is able to cope with a work route presenting an irregular walking surface, such as non-leveled terrain or obstacles or a non-continuous walking surface, such as staircase or ladder, thereby achieving more flexible motion operations.

In the meantime, the legged mobile robot, regenerating the mechanism of the living body or motions of the human beings, is termed a "humanoid" or a "humanoid robot". The humanoid robot is able to support the human life, that is to support human activities, in various aspects of our everyday life, such as in our living environments.

The major portions of the work space or the living space of the human beings are tailored to the bodily mechanism and the behavior patterns of the human beings, which are erect and walk on two feet, and there are many obstacles to motions of the state-of-the-art mechanical system, having wheeled or the like driving device as motion means. Thus, in order for the mechanical system, that is, the robot, to take the place of the human beings in a large variety of tasks or operations and to adapt itself to the living environment of the human beings, it is desirable that the possible range of motion of the robot is substantially the same as that of the human beings. This accounts for the great general expectation towards practical utilization of legged mobile robots.

The legged mobile robot of a large height is presupposed to be used on terrains of a variety of different conditions, including both level and non-level terrains, such that many use environments of the robot may depart from normal use conditions that may be managed by the control system of the robot body. Thus, the possibility of occurrence of an unforeseen reflection type error is higher with the legged mobile robot than in other mechanical devices. It is therefore desirable for the robot to perform the processing for avoiding a variety of errors autonomously.

SUMMARY OF THE INVENTION

It is therefore an object of the present invention to provide a motion controlling apparatus and a motion controlling method for a legged mobile robot in which motions on occurrence of a reflection type error may be assured.

It is another object of the present invention to provide a motion controlling apparatus and a motion controlling method for a legged mobile robot in which the processing for avoiding the reflection type error may be carried out autonomously.

In view of the above objects, the present invention provides, as a first aspect, a motion controlling method for a legged mobile robot having at least a plurality of movable legs, in which the method comprises a command receiving step of receiving a command for actuating a robot body, entered from an operating system, a motion realization step of executing a motion of the robot body specified by the command for actuating a robot body, a sensing step of detecting an inner state of the robot body to output the sensor information, an error detection step of detecting an error occurring on the robot body and/or elimination of the error based on the sensor information, and a gating step of stopping the processing of the command for actuating the robot body by the motion realization means, responsive to the error detection, and/or re-initiating the processing of the command for actuating the robot body responsive to the error elimination. The present invention also provides a motion controlling apparatus for carrying out the motion controlling method.

The command receiving means or step mounts TCP/IP or the like communication protocol and is able to effectuate wired or wireless data communication with an external remote operating system.

The motion realization means or step includes a number of resource management posture transition control modules of the robot for distributing the processing in terms of a resource, exemplified by a head, a body, an arm and a leg, as a unit, responsive to the command for actuating the robot body, an agent for scheduling a motion for each resource to make a request for locomotion generation or motion reproduction in keeping with contents, and locomotion generating or motion reproducing means for generating a walking style in real-time responsive to a request from the agent or changing command values of an angle of each joint responsive to the motion requested by the agent.

According to the present invention, the concept of the 'gate' has been introduced in the locomotion generating means or step and in the motion reproducing means or step. As long as this gate is open, a command from the client may be accepted to generate the locomotion or reproduce the motion. However, if once the gate is closed, the command may be refused. This gate opening/closing operation is carried out responsive to the result of the error detection.

Even though the gate is closed, the gate is able to cope with a command for eliminating an error, thus enabling an error avoiding motion to be performed.

The motion controlling apparatus or method for a legged mobile robot according to the first aspect of the present invention may further include an error elimination means or step for executing an error eliminating operation responsive to the result of error detection by the error detection means.

The error detection means or step may detect an error in the falling priority sequence of an operation in the torque limiter, overcurrent detection, clinching, falldown and in stability discrimination, taking into account the effect to external environment the error has.

The error elimination means or step may lower the gain of each joint actuator where the torque limiter is operating, responsive to operation detection in the torque limiter in a joint actuator, to change a command value of the angle of each joint to a measured value to lower the torque.

The error elimination means or step may lower the gain of each joint actuator, responsive to detection of an overcurrent in the joint actuator, where the overcurrent has occurred to change a command value of the angle of each joint to a measured value to lower the torque.

The error elimination means or step may lower the gain of the joint actuator, responsive to detection of clinching in the joint, as a site of the clinching.

The error elimination means or step may lower the gain of each joint actuator, responsive to detection of falldown of the robot body, to cause the robot to assume an impact-accommodating passive posture matched to the falldown direction.

The error elimination means or step may instruct the motion realization means to perform a motion of bracing legs, responsive to detection of loss of stability of the robot body, to avoid falldown to raise the position of the center of gravity.

There may further be provided a restoration manager which, when the robot has assumed an unknown posture, causes the robot to revert to a known posture closest to the unknown posture, responsive to error detection, to cause the robot to be restored to a predetermined posture transition model.

As a second aspect, the present invention provides a remote operating method for a legged mobile robot having at least a plural number of mobile legs, in which the method comprises an inputting step of accepting the inputting of a command for actuating the legged mobile robot from a user, a command processing step of converting a command via the inputting step of actuating the legged mobile robot to a command for actuating the robot body to transmit the resulting command for actuating the robot body to the legged mobile robot, and a feedback step of receiving an error detection result from the legged mobile robot to feed back the so received error detection result to the inputting means. The present invention also provides a remote operating apparatus for carrying out the remote operating method.

The feedback means or step may impose limitations on the inputting from the inputting means responsive to receipt of the error detection result from the legged mobile robot.

The feedback means or step may eliminate the limitations on the inputting from the inputting means responsive to notification of the fact of error elimination from the legged mobile robot.

The feedback means or step may impose an impact on the inputting means if the type of the detected error notified from the legged mobile robot is the falldown of the robot body.

According to the present invention, there may be provided a motion controlling apparatus and a motion controlling method for a legged mobile robot in which it is possible to guarantee the robot motions on the occasion of occurrence of a reflection type error.

According to the present invention, there may also be provided a motion controlling apparatus and a motion controlling method for a legged mobile robot in which it is possible to execute the processing of avoiding the occurrence of a reflection type error autonomously Other objects, features and advantages of the present invention will become more apparent from the embodiments of the present invention as shown with the accompanying drawings.

DESCRIPTION OF THE PREFERRED EMBODIMENTS

Figure 1:
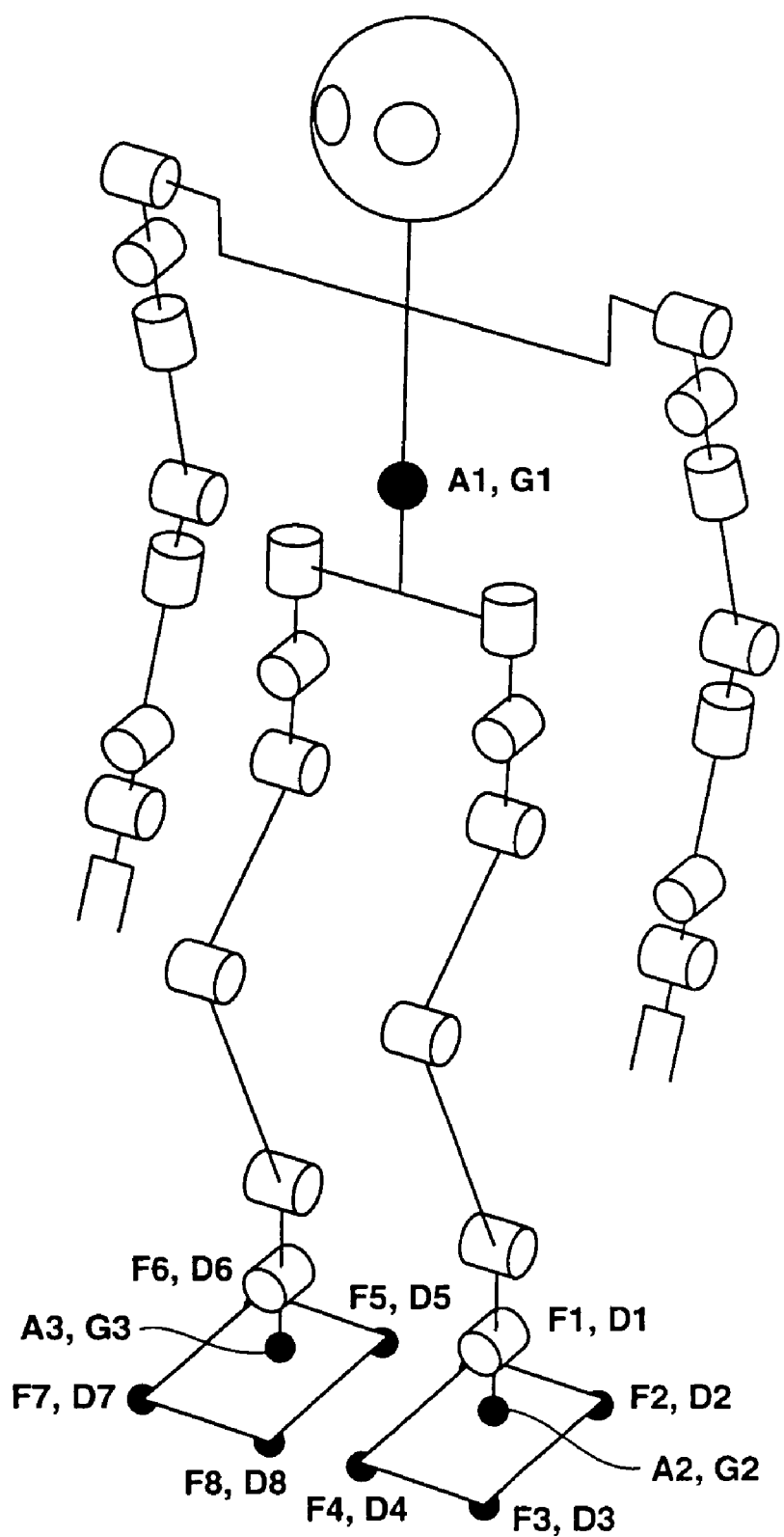
FIG. 1 schematically shows the structure of the degrees of freedom of a legged mobile robot embodying the present invention.

Referring to the drawings, preferred embodiments of the present invention will be explained in detail.

FIG. 1 schematically shows the structure of the degrees of freedom of the legged mobile robot embodying the present invention.

The robot shown in FIG. 1 is a humanoid robot having two arms and two legs. The present robot has a robot body and four limbs, mounted to the robot body. Specifically, the robot is made up by left and right arms, having seven degrees of freedom, namely a shoulder joint pitch axis, a shoulder joint roll axis, an upper arm yaw axis, an elbow joint pitch axis, a forearm yaw axis, a wrist roll axis and a wrist pitch axis, and left and right legs, having six degrees of freedom, namely a hip joint yaw axis, a hip joint roll axis, a hip joint pitch axis, a knee pitch axis, an ankle pitch axis and an ankle roll axis.

These degrees of freedom, provided by the joints, are actually implemented by actuator motors. In the present embodiment, there are mounted a number of small-sized AC gear-coupled servo actuators each including a servo control system arranged as one chip and loaded in a motor unit. This type of the AC servo actuator is disclosed in, for example, the Japanese Laid-Open Patent Publication No. 2000-299970 (specification and drawings of the Japanese Patent Application H11-33386) already assigned to the present Assignee.

On the robot body are mounted an acceleration sensor A1 and a gyro G1. To the four corners of the left and right foot soles, there are mounted uniaxial load cells (F1 to F8) for detecting the force of reaction from the floor, operating in the direction perpendicular to the foot sole surface and infrared light distance sensors (D1 to D8) for measuring the distance up to the floor surface. To mid parts of the left and right foot soles, there are mounted acceleration sensors (A2, A3) and gyros (G2, G3).

The legged mobile robot of the present embodiment uses the ZMP (zero moment point) as a criterium for determining the stability in walking. The criterium for verifying the degree of walking stability by the ZMP is based on the "d'Alembert's principle" which states that the gravity and the force of inertia from the walking system to the road surface and the moment thereof are in equilibrium with the force of reaction from the floor as the reaction from the road surface to the walking system and the moment of the force of reaction from the floor. As a conclusion of the inference of mechanics, there exists a point of zero moments of the pitch and roll axes, that is the zero moment point (ZMP), on or inwardly of a side of a supporting polygon (i.e., ZMP stable area) defined by the touchdown point of the foot soles and the road surface.

In sum, the ZMP criterium states: "the robot is able to walk in stability without falldown (rotational motion of the robot body) if the ZMP lies in the inside of a supporting polygon formed by the foot units and the road surface at any instants of the walking, and at the same time if the robot exerts the force in a direction of thrusting the road surface".

The generation of a two-legged walking pattern by the ZMP criterium has an advantage that the foot sole touchdown point can be set in advance such that constraint conditions for the foot sole kinematics in conformity to the road surface may more readily be taken into consideration. In addition, the use of the ZMP as the criterium for determining the stability means handling not the force but the trajectory as a target value for motion control and hence has high technical feasibility.

Meanwhile, the concept of ZMP and use of the ZMP as the criterium for determining the stability of the walking robot are disclosed in Miomir Vukobratovic, 'Legged Locomotion Robots' and in Ichiro Kato et al. "Walking Robot and Artificial Legs", published by NIKKAN KOGYO SHIMBUM-SHA.

Figure 2:
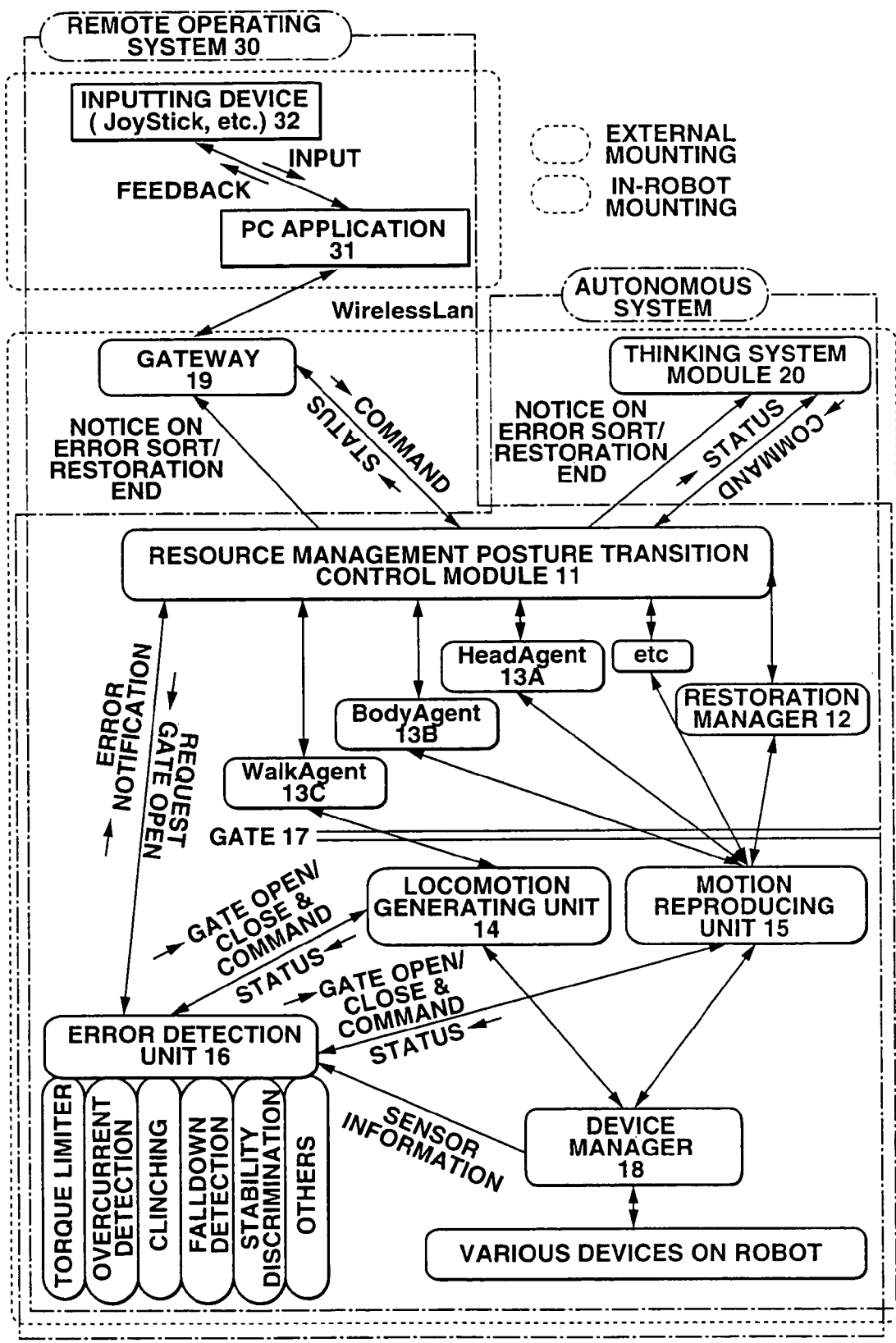
FIG. 2 schematically shows the functional structure of a motion controlling system applied to the legged mobile robot embodying the present invention.

FIG. 2 schematically shows the functional structure of a motion controlling system applied to the present embodiment of the legged mobile robot.

As shown therein, the present embodiment of the legged mobile robot is adapted for being operated responsive to commands from a thinking system module 20 or to commands from a remote operating system 30. The thinking system module 20 is mounted in the inside of the robot body to control the autonomous motions. The remote operating system 30 is mounted outside the robot body.

The thinking system module 20 implements autonomous actions and operations on the robot body.

The remote operating system 30 is formed by a computer system having a wireless LAN function, such as a personal computer (PC), and includes an inputting device and a PC application 31.

An inputting device 32 is constructed by a user inputting device, such as a joystick, keyboard or a mouse, and accepts commands to a robot which are based on manual operations by a user.

The PC application 31 is coupled to the robot over wireless LAN and exchanges data with the actual robot. The PC application 31 monitors inputting device signals at all times, converts the signals into a command to a robot, sends the command to the robot and receives a response or a notification on an error from the robot.

A gateway 19 is an in-robot object, having mounted a communication protocol, such as TCP/IP, and is adapted for implementing wired or wireless communication with an external computer of, for example, the remote operating system 30.

The robot has a number of resource management posture transition control modules 11 each of which is responsive to transmitted commands to distribute the processing in terms of a resource, such as a head, a trunk, an arm or a leg, as a unit. The control module 11 also verifies consistency in posture transition and takes charge of transition from the non-consistent posture to a consistent posture responsive to the command.

When the robot has fallen into an unknown posture, a restoration manager 12 restores the robot to the nearest known posture, from the unknown posture, for reversion to a predetermined posture transition model.

A set of agents schedules the motions for the respective resources and requests locomotion generation and motion reproduction which are consistent with the contents. In the embodiment illustrated, the set of agents includes a head agent 13A, scheduling the motions of the head unit, a body agent 13B, scheduling the motions of the body unit, and a walk agent 13C, scheduling the motion for walking.

A locomotion generating unit 14 is an object responsive to a request from an agent to generate the walking style in real-time. Responsive to the generated result, the locomotion generating unit calculates respective joint angles of the lower limbs, also taking stabilization of the posture into account, to formulate command values to the device.

A motion reproducing unit 15 is responsive to a motion requested from the agent to change command values of respective joint angles.

An error detection unit 16 refers to sensor values from the respective devices at all times to monitor the presence or absence of an error state. The error state may be exemplified by an operation (error) in a torque limiter, overcurrent, clinching, falldown and in stability discrimination. For the errors, a priority sequence is set, such that the processing for detection and evasion is carried out in the order of the falling order in the priority sequence.

In the present embodiment, the concept of 'a gate 17' is introduced to the locomotion generating unit 14 and to the motion reproducing unit 15. As long as this gate 17 is open, the locomotion generating unit 14 and to the motion reproducing unit 15 accept a command from a client. However, if once the gate 17 is closed, the units 14, 15 are able to refuse the command. It is the error detection unit 16 that is in charge of the operation of opening/closing the gate 17. The gate 17 is able to cope with a command if such command is from the error detection unit 16, even in case the gate 17 is closed, thus providing for an error evading operation.

The device manager 18 communicates with respective devices that make up the robot, such as actuators or sensors, while receiving command values or measured values.

The basic operations of the motion controlling system, shown in FIG. 2, include the remote operating system 30 monitoring inputting device signals on the PC application 31 to convert the inputting device signals to commands for the robot. The so formulated commands are sent to the resource management posture transition control module 11 of the robot over wireless LAN through a gateway 19 in the robot. A response to the command then is sent in similar fashion to the PC application 31.

On error detection, the requested commands are all blocked by the internal processing within the robot such that an error that has occurred in the operating system does not affect the robot. Moreover, the type of the error that has occurred is sent to the operating system so that corresponding feedback may be applied to the inputting device 32. On elimination of the error, that effect is notified to the operating system, such that the remote operating system is able to re-start routine command input.

During the autonomous behavior of the robot, a command may be sent not from the remote operating system 30 but from the thinking system module 20. On error detection, the requested commands are all blocked by the internal processing within the robot, whereas, on error elimination, that effect is sent to the operating system, thus allowing re-initiation of routine command inputs from the remote operating system 30. Moreover, even if an error has occurred, the error sort may be used by the thinking system module 20 in manifesting optional feeling expressions.

The operation of this operation communication system is now explained.

In carrying out remote operations, the PC application 31 issues commands to the robot, based on the input information acquired from the inputting device 32, to transmit the command to the robot over wireless LAN.

On receipt of a command from the remote operating system 30, each resource management posture transition control module 11 of the robot schedules the motions for the respective resources by a relevant agent 13 via the gateway 19 and, responsive to the contents thereof, requests the locomotion generating unit 14 or the motion reproducing unit 15 to realize the motions. The locomotion generating unit 14 or the motion reproducing unit 15 calls the device manager 18 to transmit command values to corresponding devices of the robot.

From the various devices of the robot, the sensor information, detected on actuation based on the command values, is transmitted to the inputting device though a path reverse to that in propagating the command.

The device manager 18 also sends to the error detection unit 16 the sensor information detected on actuation based on a command value from the remote operating system 30.

The error detection unit 16 detects errors, such as an operation in the torque limiter, overcurrent, clinching, falldown or stability discrimination. On detecting an error on the robot body, the error detection unit 16 commands the locomotion generating unit 14 and the motion reproducing unit 15 to close the gate 17. Responsive to the gate closure, the locomotion generating unit 14 and the motion reproducing unit 15 refuse a command from the client (remote operating system 30 or thinking system module 20) through the gate 17.

The error detection unit 16 issues a command to the locomotion generating unit 14 or to the motion reproducing unit 15 for requesting the motion of the robot body on error detection, at the same time as the error detection unit 16 issues the command for closing the gate 17.

On error detection, the error detection unit 16 notifies that effect to each resource management posture transition control module 11 of the robot. The resource management posture transition control module 11 of the robot then notifies the error type to the remote operating system 30 through the gateway 19. The error type is similarly notified to the thinking system module 20.

The locomotion generating unit 14 or the motion reproducing unit 15 then prosecutes an error evading processing, under a command from the error detection unit 16. The locomotion generating unit 14 or the motion reproducing unit 15 returns a status, attendant on command execution, to the error detection unit 16.

The error detection unit 16 checks to see if the error has been eliminated, based on the sensor information from the various devices mounted to the robot. On correction of the error, the error detection unit 16 commands the locomotion generating unit 14 and the motion reproducing unit 15 to open the gate 17. With the gate 17 thus opened, the locomotion generating unit 14 and the motion reproducing unit 15 are able to accept commands from the client through the gate 17.

The error detection unit 16 notifies the fact of error elimination to each resource management posture transition control module 11 of the robot. Each resource management posture transition control module 11 of the robot sends a notice on the end of reversion processing to the remote operating system 30 through the gateway 19, while also sending the notice on the end of the reversion to the thinking system module 20.

Figure 3:
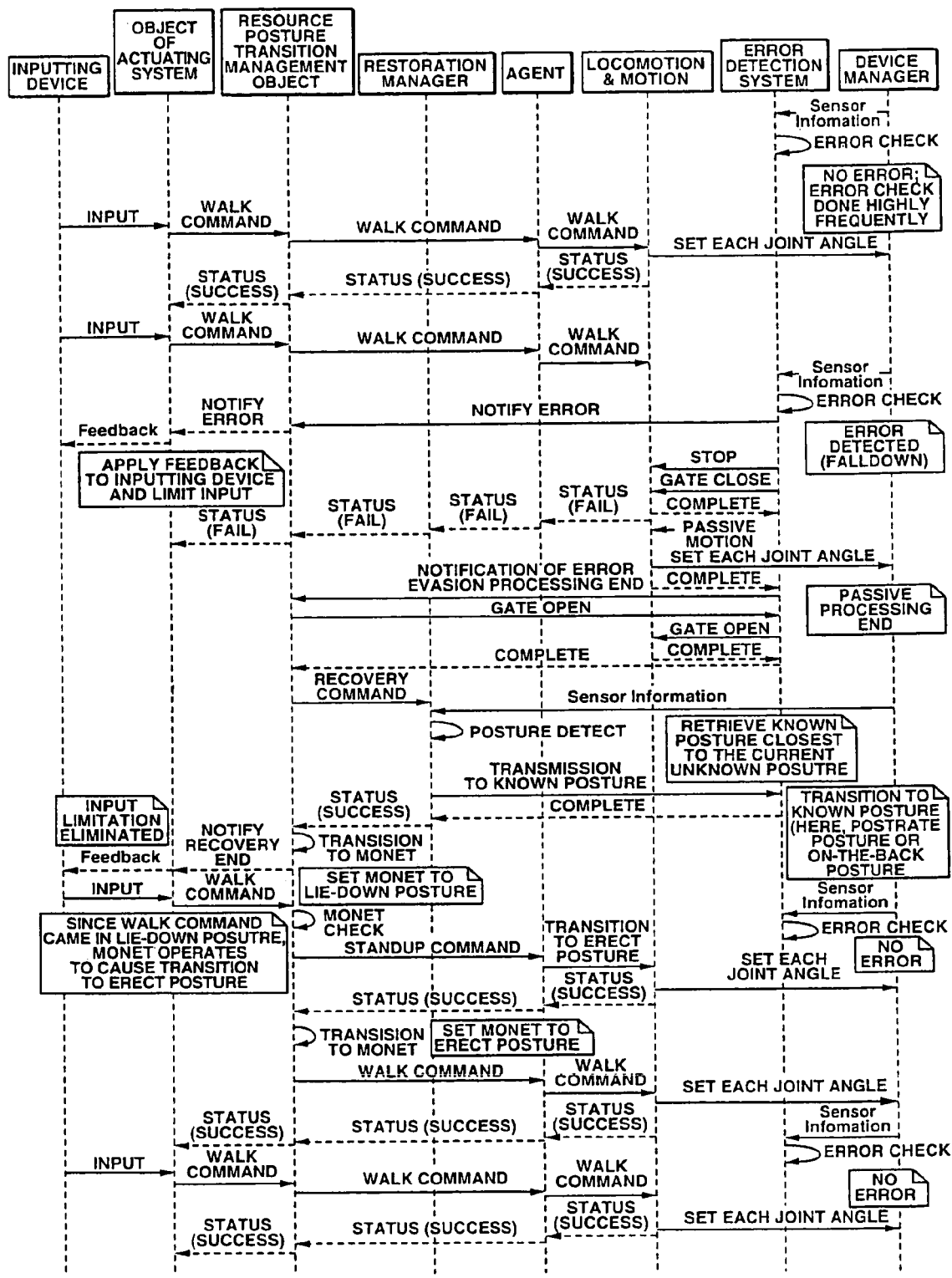
FIG. 3 shows a sequence of motions of the robot based on commands from a remote controlling system.

FIG. 3 shows the sequence of operations when the robot performs motions under a command from the remote operating system 30, taking the motion of walking (WALK) as an example.

When a WALK command from a user is input through the inputting device 32, the command is converted on the PC application 31 into a WALK command for robot actuation. This command then is transmitted over the gateway 19 to each resource management posture transition control module 11 of the robot.

Each resource management posture transition control module 11 of the robot requests the pertinent agent 13 to perform the motion corresponding to the WALK command requested from the remote operating system 30. The agent 13 issues the WALK command to the locomotion generating unit 14 or to the motion reproducing unit 15. The locomotion generating unit 14 or motion reproducing unit 15 sets respective joint angles in the device manager 18, for realization of the motions of the robot body matched to the WALK command. The device manager 18 accordingly drives respective devices of the robot.

The locomotion generating unit 14 or motion reproducing unit 15 returns a response (STATUS) to the command to the agent 13. This response is returned via gateway 19 to the PC application 31. The above-described sequence of operations is repeated until the set of motions comes to a close.

The device manager 18 sends the sensor information, acquired from the respective devices of the robot, to the error detection unit 16. Based on this sensor information, the error detection unit 16 is able to detect the error that has occurred on the robot body.

It is assumed that the error detection unit 16 has detected an error 'falldown' during the execution of the WALK command. The error detection unit 16 notifies the error to each resource management posture transition control module 11 of the robot (NOTIFY ERROR). Then, each resource management posture transition control module 11 of the robot notifies the fact of error occurrence to the PC application 31 via gateway 19. The PC application 31 feeds back the error notice to the inputting device 32 or limits the input via inputting device 32.

The error detection unit 16 commands the locomotion generating unit 14 or the motion reproducing unit 15 to stop the WALK motion (STOP) and to close the gate 17 (GATE CLOSE). The locomotion generating unit 14 or the motion reproducing unit 15 returns the response to the command (STATUS (FAIL)) to the agent 13. This response is returned through the agent 13, restoration manager 12 and each resource management posture transition control module 11 of the robot to the PC application 31 via gateway 19.

The error detection unit 16 commands a behavior for evading the error produced to the locomotion generating unit 14 or to the motion reproducing unit 15. If the initial falldown is detected, the detection evading action is performed. However, since the contents of the error in the illustrated embodiment are 'falldown' the error detection unit 16 commands the locomotion generating unit 14 or the motion reproducing unit 15 to take a passive posture. Meanwhile, if it is the clinching that has been detected, the motion is halted and the gain of the pertinent joint actuator is lowered. If the overcurrent or the operation in the torque limiter is detected, the motion is slowed down. These commands for the evading behavior are repeatedly issued until elimination of the error in question.

On completion of the error evading behavior, the locomotion generating unit 14 or the motion reproducing unit 15 notifies this to the error detection unit 16 (COMPLETE). The error detection unit 16 notifies each resource management posture transition control module 11 of the robot of the end of the processing for error evasion.

Each resource management posture transition control module 11 of the robot is responsive to the end of the processing for error evasion to notify the opening of the gate 17 (GATE OPEN). The error detection unit 16 commands the locomotion generating unit 14 and the motion reproducing unit 15 to open the gate 17. On completion of the opening of the gate 17, the locomotion generating unit 14 and the motion reproducing unit 15 notifies the error detection unit 16 of that effect (COMPLETE). As from this time, the locomotion generating unit 14 and the motion reproducing unit 15 are again able to accept the command from the client.

After the error evading behavior is done, it is likely that, due to the error processing, the robot posture is not as presupposed. Thus, the error detection unit 16 issues a RECOVERY command to each resource management posture transition control module 11 of the robot for reversion of the robot from the unknown posture to the nearest known posture. Then, each resource management posture transition control module 11 of the robot is responsive to the RECOVERY command to call the restoration manager 12.

The restoration manager 12 acquires the sensor information from the device manager 18 to search for the known posture nearest to the current unknown posture (posture detect) to execute transition to the known posture. On termination to the transition to the known posture, the restoration manager 12 notifies this to the error detection unit 16 (COMPLETE). In case the unknown posture is falldown, the known posture nearest to this is e.g. the on-the-back posture or the prostrate posture.

The error detection unit 16 notifies restoration to the known posture (STATUS (SUCCESS)) to each resource management posture transition control module 11 of the robot. Using a predetermined posture transition model, each resource management posture transition control module 11 of the robot causes transition from the known posture to a fundamental posture on the posture transition model. If the known posture is e.g. an on-the-back posture or a prostrate posture, the fundamental lie-down posture is set.

When this is completed, each resource management posture transition control module 11 of the robot notifies the end of restoration from the error to the PC application 31 via gateway (NOTIFY RECOVERY END). The PC application 31 feeds this back to the inputting device 32. For example, if limitations are imposed on the input by error detection, the limitations on the input are removed. As a result, the inputting from the inputting device 32 is re-initiated.

If, at the time of re-initiation of transmission of the command for the robot from the remote operating system 30, posture inconsistency is produced, posture transition occurs in an inconsistency canceling direction, and the robot side automatically transfers to the consistent posture, after which command execution is commenced.

In the illustrated embodiment, when the WALK command is sent from the remote operating system 30, each resource management posture transition control module 11 of the robot detects that the robot is in the lie-down posture which is mismatched to execute the received command. Responsive thereto, the resource management posture transition control module 11 boots a predetermined posture transition model to cause transition to an erect posture. To this end, each resource management posture transition control module 11 of the robot issues a STANDUP command to the agent 13, which then commands the locomotion generating unit 14 or the motion reproducing unit 15 to make transition to the erect state. The locomotion generating unit 14 or the motion reproducing unit 15 sets in the device manager 18 each joint angle adapted for realization of the transition to the erect state.

On completion of the transition to the erect state, the locomotion generating unit 14 or the motion reproducing unit 15 returns STATUS (SUCCESS) to the agent 13, which returns this to each resource management posture transition control module 11 of the robot. Each resource management posture transition control module 11 of the robot sets the posture transition model to the erect state.

Each resource management posture transition control module 11 of the robot then requests the relevant agent 13 to perform a motion matched to the WALK command requested from the remote operating system 30. The agent 13 issues the WALK command to the locomotion generating unit 14 or the motion reproducing unit 15. For realizing the motion of the robot body matched to the WALK command, the locomotion generating unit 14 or the motion reproducing unit 15 sets each joint angle in the device manager 18, which accordingly actuates each device of the robot.

The locomotion generating unit 14 or the motion reproducing unit 15 returns a response to the command (STATUS) to the agent 13. This response is returned via gateway 19 to the PC application 31. The above-described sequence of operations is repeated until a series of motions comes to a close.

The device manager 18 sends the sensor information acquired from each device of the robot to the error detection unit 16. Based on this sensor information, the error detection unit 16 monitors the error occurrence on the robot body.

In a similar sequence of operations, execution of commands from the remote operating system and operations such as error detection, error processing, transition to known postures and inputting re-initiation are caused to occur repeatedly.

Figure 4:
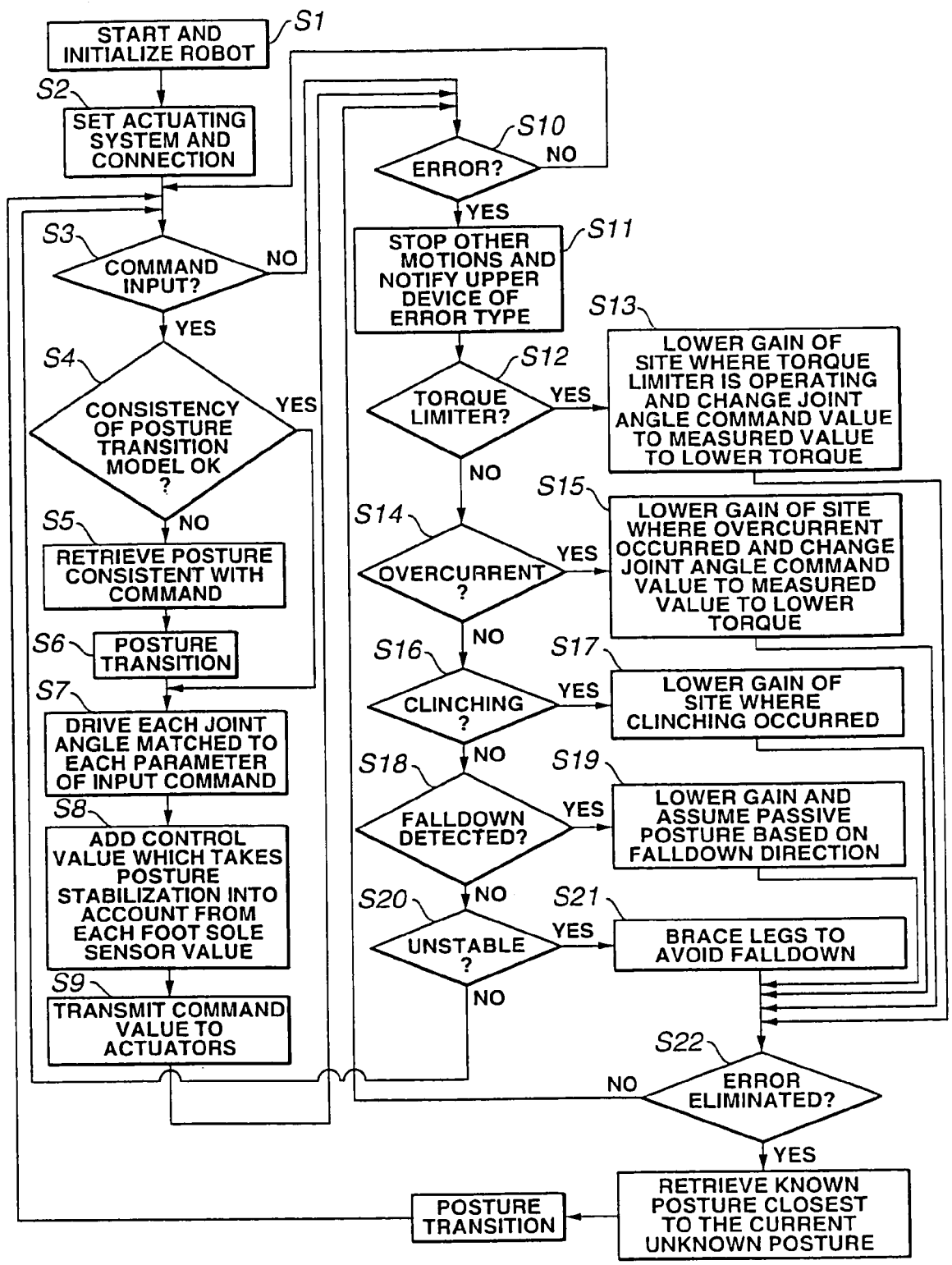
FIG. 4 is a flowchart showing the procedure of error detection processing by the legged mobile robot during walking.

FIG. 4 shows, in the form of a flowchart, the sequence of operations of the error detection processing during walking of the legged mobile robot.

On power up of the legged mobile robot, self-diagnosis of the hardware and other initializing processing operations are executed (step S1).

The connection between the legged mobile robot and the remote operating system, formed by the PC etc., in the form of the wireless LAN or other network configurations, is established (step S2) so that a state enabling the command exchange is set.

On receipt of the command pertinent to the actuation of the robot body from the remote operating system 30 (step S3), each resource management posture transition control module 11 of the robot verifies whether or not the contents of the actuation are matched to the current status on the posture transition model of the robot body (step S4).

If the actuation command is not matched to the state on the posture transition model, the posture matched to the actuation command is retrieved (step S5) to execute posture transition (step S6).

The locomotion generating unit 14 or the motion reproducing unit 15 derives each joint angle, pertinent to respective parameters (step length and period and direction of walking) of the actuating command, entered from the remote operating system 30, by a technique such as reverse kinematics (step S7). From the values of the foot sole sensors, the device manager 18 adds a control value which takes posture stabilization into account (step S8) to transmit command values to the actuators (step S9).

In the absence of the command from the remote operating system 30 (step S3) or after completion of the processing of the input command (step S9), the error detection unit 16 detects an error based on the sensor information returned from the device manager 18 (step S10).

If no error has been detected, processing reverts to the step S3 to wait for the next command input from the remote operating system 30. If an error has been detected, the error detection unit notifies the fact of error occurrence to the locomotion generating unit 14 and the motion reproducing unit 15 to stop other operations, while also notifying the fact of error occurrence to each resource management posture transition control module 11 of the robot (step S12). The resource management posture transition control module 11 of the robot further notifies the sort of the error to upper order units of the remote operating system.

From the perspective of assuring the operations of the robot body, the error detection unit 16 has the priority sequence of error detection. In the present embodiment, the priority sequence is accorded to an operation in the torque limiter, overcurrent, clinching, falldown detection and stability discrimination in the falling order.

The error detection unit 16 first detects an operation in the torque limiter in each joint actuator (step S12). If an error is detected here, the gain of each joint actuator where the torque limiter is in operation is lowered, while the command values of the angles of the joints are changed to measured values to lower the torque (step S13).

The error detection unit 16 then detects the overcurrent in each joint actuator (step S14). If the overcurrent is detected, the gain of each joint actuator where the overcurrent occurred is lowered, and the command values of the angles of the joints are changed to measured values to lower the torque (step S15).

The error detection unit 16 then detects the occurrence of clinching at each joint (step S16). On detection of the clinching, the gain of the joint actuator where the clinching has occurred is lowered (step S17).

The error detection unit 16 then detects the possible occurrence of falldown (step S18). If the falldown is detected, the error detection unit 16 lowers the gain of each joint actuator to cause the robot to assume a passive impact-accommodating posture conforming to the falldown direction (step S19).

The error detection unit 16 then determines the degree of stability of the robot body (step S20). If the stability is lost, the error detection unit 16 commands the locomotion generating unit or the motion reproducing unit to brace legs to prevent falldown to raise the position of the center of gravity of the robot (step S21).

After performing the processing in keeping with the error detected in the steps S13, S15, S17, S19 or S21, or if no error has been detected, it is verified whether or not the error has been eliminated (step S22).

If the error has not been eliminated, processing reverts to the step S10 to repeat the above-described processing of error detection.

If the error has been eliminated, each resource management posture transition control module 11 of the robot retrieves a known position nearest to the current unknown position (step S23). Then, processing reverts to the step S3 to wait for the inputting of the next command from the remote operating system.

Figure 5:
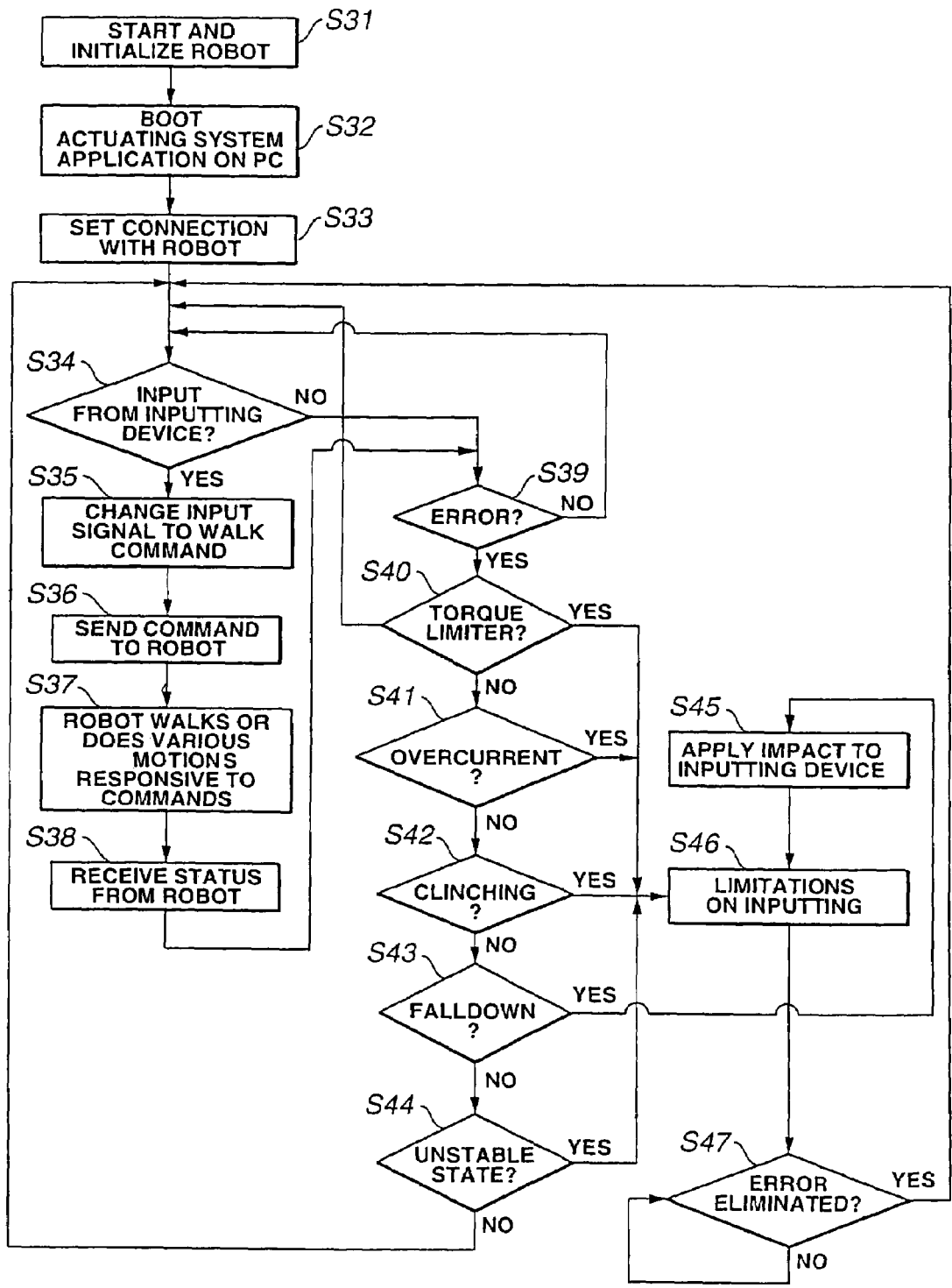
FIG. 5 is a flowchart showing the processing by the remote controlling system when the error detection processing is carried out on the side of the legged mobile robot.

FIG. 5 shows, in the form of a flowchart, the sequence of processing operations in the remote operating system 30 when the processing of error detection has been carried out on the side of the legged mobile robot, as the robot is being remote-controlled to walk, using e.g. a PC, operating as the remote operating system.

On power up of the legged mobile robot, the robot side executes self-diagnosis of the hardware and other initializing operations (step S31).

On the PC, as the remote operating system 30, the PC application 31 of the actuating system is booted (step S32).

The PC is connected to the robot by wireless LAN or the like network (step S33) to set up a state capable of exchanging commands.

The remote operating system 30 includes the inputting device 32 for a user to enter a command for robot actuation, such as a joystick, a keyboard or a mouse. If such command has been entered from the inputting device 32 (step S34), this input signal is converted into a walking command (step width, step periods or walking direction). The so generated command is transmitted to the robot over the gateway 19 (step S36).

Responsive thereto, the robot side executes the walking or the like motions, matched to the command (step S37), to return the status to the remote operating system 30 (step S38).

Should there be no input from the inputting device 32 (step S34) or after the status has been received from the robot (step S38), it is verified whether or not an error has occurred on the robot side (step S39).

If no error has been detected, processing reverts to the step S34 to wait for the inputting of the next user's command from the inputting device 32.

If conversely an error has been detected, the error type is identified. That is, in a step S40, it is verified whether or not the torque limiter has been in operation. In a step S41, it is verified whether or not overcurrent has occurred. In a step S42, it is verified whether or not clinching has occurred. In a step S43, it is verified whether or not the robot body has fallen down and, in a step S44, it is verified whether or not the robot body is in an unstable state.

If any of the operation of the torque limiter, overcurrent, clinching and the unstable state is detected, limitations are imposed on the inputting from the inputting device (step S46). On the other hand, if the falldown of the robot body is detected, an impact is applied to e.g. a joystick, by way of user feedback through the inputting device (step S45), after which limitations are imposed on the inputting from the inputting device (step S46).

If the error has been resolved (step S47), processing reverts to the step S34 to wait for the next input from the inputting device.

The present invention has so far been elucidated with reference to certain specific embodiments thereof. However, as may be apparent to those skilled in the art, various changes, substitutions or equivalents may be envisaged without departing from the scope and the purport of the invention as defined in the appended claims.

The purport of the present invention is not necessarily limited to a product termed a "robot". That is, the present invention may be applied to any mechanical apparatus performing motions similar to those of the human being, based on electrical or magnetic actions, even though the apparatus belongs to other field of the industry, such as toys.

In sum, the present invention has been disclosed by way of illustration and the contents of the description of the present specification is not to be construed in a limiting sense. For understanding the purport of the present invention, reference is to be made to the description of the appended claims.

What is claimed is:

1. A motion controlling apparatus for a legged mobile robot having at least a plurality of movable legs, said apparatus comprising:
   command receiving means for receiving a command for actuating a robot body, entered from an operating system;
   motion realization means for executing a motion of the robot body specified by said command for actuating the robot body;
   sensor means for detecting an inner state of said robot body to output the sensor information;
   error detection means for detecting an error occurring on said robot body and/or elimination of said error based on said sensor information; and
   gate means for stopping the processing of said command for actuating the robot body by said motion realization means, responsive to said error detection, and/or re-initiating the processing of said command for actuating the robot body responsive to said error elimination,
   wherein said command receiving means has mounted thereto a communication protocol, exemplified by TCP/IP, and effects wired or wireless data communication with an external remote operating device.

2. The motion controlling apparatus for a legged mobile robot according to claim 1, wherein said motion realization means includes a number of resource management posture transition control modules for said robot for distributing the processing in terms of a resource, exemplified by a body trunk and a waist, as a unit, responsive to the command for actuating the robot body;
   an agent for scheduling a motion for each resource to make a request for locomotion generation or motion reproduction in keeping with contents; and
   locomotion generating or motion reproducing means for generating a walking type in real-time responsive to said request from said agent or changing a command value of an angle of each joint responsive to the motion requested by said agent.

3. The motion controlling apparatus for a legged mobile robot according to claim 2, wherein, as regards the posture transition, each resource management posture transition control module for said robot determines the consistency between the posture specified by the command for robot body actuation and the current posture and causes transition from a posture inconsistent with the command to a posture consistent with the command.

4. The motion controlling apparatus for a legged mobile robot according to claim 1, further comprising:
   error elimination means for executing an error eliminating operation responsive to the result of error detection by said error detection means.

5. The motion controlling apparatus for a legged mobile robot according to claim 4, wherein said error elimination means is responsive to error detection in the torque limiter in a joint actuator to lower the gain of each joint actuator where the torque limiter is operating to change the command value of the angle of each joint to a measured value to lower the torque.

6. The motion controlling apparatus for a legged mobile robot according to claim 4, wherein said error elimination means is responsive to detection of an overcurrent in the joint actuator to lower the gain of the joint actuator where the overcurrent has occurred to change the command value of the angle of each joint to a measured value to lower the torque.

7. The motion controlling apparatus for a legged mobile robot according to claim 4, wherein said error elimination means is responsive to detection of clinching in the joint to lower the gain of the joint actuator as a site of the clinching.

8. The motion controlling apparatus for a legged mobile robot according to claim 4, wherein said error elimination means is responsive to detection of falldown of said robot body to lower the gain of each joint actuator to cause the robot to assume an impact-accommodating passive posture matched to the falldown direction.

9. The motion controlling apparatus for a legged mobile robot according to claim 4, wherein said error elimination means is responsive to detection of loss of stability of said robot body to instruct said motion realization means to perform a motion of bracing legs to avoid falldown to raise the position of the center of gravity of said robot body.

10. The motion controlling apparatus for a legged mobile robot according to claim 1, wherein an error is detected in the falling priority sequence of an operation in the torque limiter, overcurrent detection, clinching, falldown and stability discrimination.

11. The motion controlling apparatus for a legged mobile robot according to claim 1, further comprising:
   a restoration manager which, when the robot has assumed an unknown posture, causes the robot to revert to a known posture closest to the unknown posture, responsive to error detection, to cause the robot to be restored to a predetermined posture transition model.

12. A motion controlling method for a legged mobile robot having at least a plurality of movable legs, said method comprising:
   a command receiving step of receiving a command for actuating a robot body, entered from an operating system;
   a motion realization step of executing a motion of the robot body specified by said command for actuating the robot body;
   a sensing step of detecting an inner state of said robot body to output the sensor information;
   an error detection step of detecting an error occurring on said robot body and/or elimination of said error based on said sensor information; and
   a gating step of stopping the processing of said command for actuating the robot body by said motion realization step, responsive to said error detection, and/or reinitiating the processing of said command for actuating the robot body responsive to said error elimination, wherein said command receiving means has mounted thereto a communication protocol, exemplified by TCP/IP, and effects wired or wireless data communication with an external remote operating device.

13. The motion controlling method for a legged mobile robot according to claim 12, wherein said motion realization step is executed by booting a program module comprising a number of resource management posture transition control modules for said robot for distributing the processing in terms of a resource, exemplified by a body trunk and a waist, as a unit, responsive to the command for actuating the robot body;

an agent for scheduling a motion for each resource to make a request for locomotion generation or motion reproduction in keeping with contents; and locomotion generating or motion reproducing modular for generating a walking type in real-time responsive to said request from said agent or changing the command value of an angle of each joint responsive to the motion requested by said agent.

14. The motion controlling method for a legged mobile robot according to claim 12, wherein, as regards the posture transition, each resource management posture transition control module of said robot determines the consistency between the posture specified by the command for robot body actuation and the current posture and causes transition from a posture inconsistent with the command to a posture consistent with the command.

15. The motion controlling method for a legged mobile robot according to claim 12, further comprising:

an error elimination step of executing an error eliminating operation responsive to the result of error detection by said error detection step.

16. The motion controlling method for a legged mobile robot according to claim 12, wherein, in the error detection step, an error is detected in the falling priority sequence of an operation in the torque limiter, overcurrent detection, clinching, falldown and stability discrimination.

17. The motion controlling method for a legged mobile robot according to claim 16, wherein said error elimination step is responsive to error detection in the torque limiter in a joint actuator to lower the gain of each joint actuator where the torque limiter is operating to change the command value of the angle of each joint to a measured value to lower the torque.

18. The motion controlling method for a legged mobile robot according to claim 16, wherein said error elimination step is responsive to detection of an overcurrent in the joint actuator to lower the gain of each joint actuator where the overcurrent has occurred to change the command value of the angle of each joint to a measured value to lower the torque.

19. The motion controlling method for a legged mobile robot according to claim 16, wherein said error elimination step is responsive to detection of clinching in the joint to lower the gain of the joint actuator as a site of the clinching.

20. The motion controlling method for a legged mobile robot according to claim 16, wherein said error elimination step is responsive to detection of falldown of said robot body to lower the gain of each joint actuator to cause the robot to assume an impact-accommodating passive posture matched to the falldown direction.

21. The motion controlling method for a legged mobile robot according to claim 16, wherein said error elimination step is responsive to detection of loss of stability of said robot body to instruct said motion realization step to perform a motion of bracing legs to avoid falldown of the robot body to raise the position of the center of gravity.

22. The motion controlling method for a legged mobile robot according to claim 12, further comprising:

a restoration step of restoring the robot to a known posture closest to the unknown posture, responsive to error detection, when the robot has assumed an unknown posture, to restore the robot to a predetermined posture transition model.

23. A remote operating apparatus for a legged mobile robot having at least a plural number of mobile legs, said apparatus comprising:

inputting means for accepting the inputting of a command for actuating the legged mobile robot from a user;

command processing means for converting the command via said inputting means for actuating the legged mobile robot to a command for actuating a robot body to transmit the resulting command for actuating the robot body to said legged mobile robot; and feedback means for receiving an error detection result from said legged mobile robot to feed back the so received error detection result to said inputting means, wherein said inputting means has mounted thereto a communication protocol, exemplified by TCP/IP, and effects wired or wireless data communication with an external remote operating device.

24. The remote operating apparatus for a legged mobile robot according to claim 23, wherein said feedback means is responsive to receipt of the error detection result from said legged mobile robot to impose limitations on the inputting from said inputting means.

25. The remote operating apparatus for a legged mobile robot according to claim 24, wherein said feedback means is responsive to notification of the fact of error elimination from said legged mobile robot to eliminate the limitations on the inputting from said inputting means.

26. The remote operating apparatus for a legged mobile robot according to claim 23, wherein, if the type of the detected error notified from said legged mobile robot is the falldown of said robot body, said feedback means imposes an impact on said inputting means.

27. A remote operating method for a legged mobile robot having at least a plural number of mobile legs, said method comprising:

an inputting step of accepting the inputting of a command for actuating the legged mobile robot from a user;

a command processing step of converting the command via said inputting step for actuating the legged mobile robot to a command for actuating a robot body to transmit the resulting command for actuating the robot body to said legged mobile robot; and a feedback step of receiving an error detection result from said legged mobile robot to feed back the so received error detection result to said inputting step, wherein said inputting step includes a communication protocol, exemplified by TCP/IP, and effects wired or wireless data communication with an external remote operating device.

28. The remote operating method for a legged mobile robot according to claim 27, wherein said feedback step is responsive to receipt of the error detection result from said legged mobile robot to impose limitations on the inputting from said inputting step.

29. The remote operating method for a legged mobile robot according to claim 27, wherein said feedback step is responsive to notification of the fact of error elimination from said legged mobile robot to eliminate the limitations on the inputting from said inputting step.

30. The remote operating method for a legged mobile robot according to claim 27, wherein, if the type of the detected error notified from said legged mobile robot is the falldown of said robot body, said feedback step imposes an impact on said inputting step.

* * * * *